US012260711B2

(12) United States Patent
Stevens et al.

(10) Patent No.: US 12,260,711 B2
(45) **Date of Patent: *Mar. 25, 2025**

(54) SYSTEM AND METHOD FOR MANAGING A GAME OF CHANCE

(71) Applicant: Golden Gate Casino, LLC, Las Vegas, NV (US)

(72) Inventors: Derek Stevens, Las Vegas, NV (US); Mike Palm, Las Vegas, NV (US); Matt Metcalf, Las Vegas, NV (US); Chris Bennett, Las Vegas, NV (US)

(73) Assignee: GOLDEN GATE CASINO, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,381

(22) Filed: Nov. 9, 2023

(65) Prior Publication Data

US 2024/0071179 A1 Feb. 29, 2024

Related U.S. Application Data

(63) Continuation of application No. 17/164,104, filed on Feb. 1, 2021, now Pat. No. 11,837,053.

(60) Provisional application No. 62/969,071, filed on Feb. 1, 2020.

(51) Int. Cl.

| | |
|---|---|
| ***G07F 17/00*** | (2006.01) |
| ***G07F 17/32*** | (2006.01) |

(52) U.S. Cl.
CPC ...... *G07F 17/3288* (2013.01); *G07F 17/3211* (2013.01); *G07F 17/3276* (2013.01)

(58) Field of Classification Search
None
See application file for complete search history.

(56) References Cited

U.S. PATENT DOCUMENTS

| | | | | |
|---|---|---|---|---|
| 11,837,053 | B2 * | 12/2023 | Stevens | G07F 17/3211 |
| 2007/0102877 | A1 * | 5/2007 | Personius | G07F 17/3288 463/16 |
| 2007/0243925 | A1 * | 10/2007 | LeMay | G07F 17/3239 463/20 |
| 2013/0102383 | A1 * | 4/2013 | Smith | G07F 17/32 463/25 |

* cited by examiner

*Primary Examiner* — Paul A D'Agostino
(74) *Attorney, Agent, or Firm* — Dickinson Wright PLLC

(57) ABSTRACT

A system and method for managing a game including generating a grid with a processing device. The grid is comprised of a plurality of squares defined by a plurality of rows and a plurality of columns. The method also includes establishing betting odds for each of the squares and presenting the squares and associated betting odds on a graphical user interface. The betting odds of each of the squares are associated with a likelihood of the square being established as a winning square. A winning square is designated in response to a score of a live sporting event including a digit of a score of a first team being the same as a row number of the square, and a digit of a score of a second team being the same as a column number of the square at the end of a predetermined interval of the live sporting event.

20 Claims, 6 Drawing Sheets

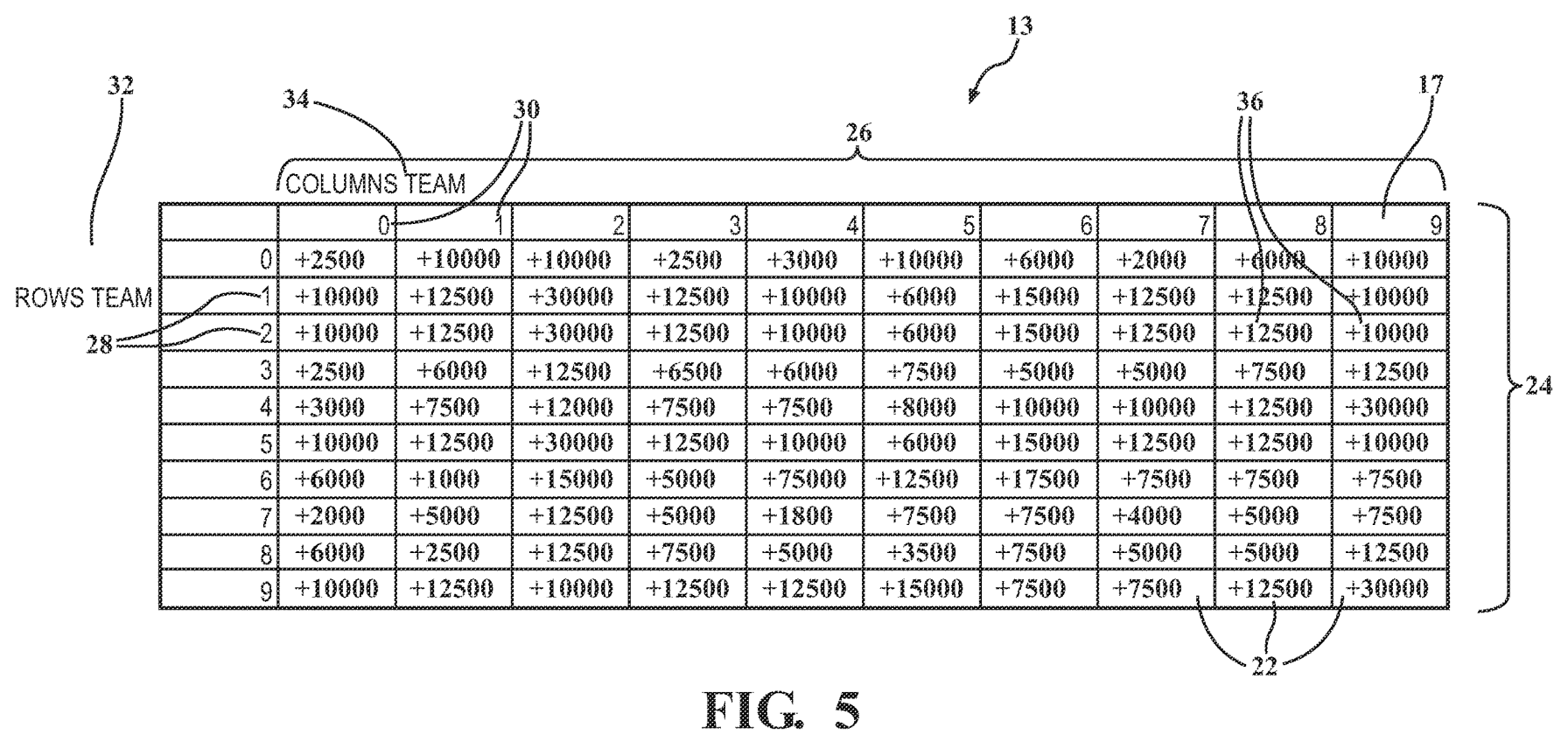

COLUMNS TEAM

| ROWS TEAM | 0 | 1 | 2 | 3 | 4 | 5 | 6 | 7 | 8 | 9 |
|---|---|---|---|---|---|---|---|---|---|---|
| 0 | +2500 | +10000 | +10000 | +2500 | +3000 | +10000 | +6000 | +2000 | +6000 | +10000 |
| 1 | +10000 | +12500 | +30000 | +12500 | +10000 | +6000 | +15000 | +12500 | +12500 | +10000 |
| 2 | +10000 | +12500 | +30000 | +12500 | +10000 | +6000 | +15000 | +12500 | +12500 | +10000 |
| 3 | +2500 | +6000 | +12500 | +6500 | +6000 | +7500 | +5000 | +5000 | +7500 | +12500 |
| 4 | +3000 | +7500 | +12000 | +7500 | +7500 | +8000 | +10000 | +10000 | +12500 | +30000 |
| 5 | +10000 | +12500 | +30000 | +12500 | +10000 | +6000 | +15000 | +12500 | +12500 | +10000 |
| 6 | +6000 | +1000 | +15000 | +5000 | +75000 | +12500 | +17500 | +7500 | +7500 | +7500 |
| 7 | +2000 | +5000 | +12500 | +5000 | +1800 | +7500 | +7500 | +4000 | +5000 | +7500 |
| 8 | +6000 | +2500 | +12500 | +7500 | +5000 | +3500 | +7500 | +5000 | +5000 | +12500 |
| 9 | +10000 | +12500 | +10000 | +12500 | +12500 | +15000 | +7500 | +7500 | +12500 | +30000 |

FIG. 5

SYSTEM AND METHOD FOR MANAGING A GAME OF CHANCE

CROSS-REFERENCE TO RELATED APPLICATIONS

This application is a continuation of U.S. patent application Ser. No. 17/164,104, filed on Feb. 1, 2021, which claims the benefit of U.S. Provisional Patent Application Ser. No. 62/969,071, filed on Feb. 1, 2020, the entire disclosures of which are hereby incorporated by reference in their entireties.

TECHNICAL FIELD

A system and method for managing a game of chance. More particularly, a system and method for managing a squares betting game based on a sporting event.

BACKGROUND

Squares is a wagering game in which players attempt to predict the last digit of scores for two teams in a live sporting event, e.g., an American football game, at the end of a predetermined interval (e.g., a quarter) of the sporting event. A squares game typically includes a 10×10 grid with the leftmost column and topmost row each labeled with the numbers 0-9 in any order. One of the teams is established as the "rows" team and the other of the teams is established as the "columns" team. Each player places an established wager, e.g., $10, for each square that they wish to purchase which goes into a wager pool. The squares may be selected by the players or randomly chosen. After each predetermined time interval of the sporting event, the last digit of each team's score is determined and the player with the corresponding square in the grid wins for the interval. For instance, if the score is 17-14 in favor of the "rows" team after the first quarter, the player that picked the square "Row 7, Column 4" would win a predetermined sum from the wager pool.

Squares games are typically managed by an organizer on paper, or on a user-generated computer spreadsheet. Typically, it is a responsibility of the organizer to assemble a large enough pool of people to fill in the squares and to gather and distribute funds from players. There remains a need for improvements to such squares games.

SUMMARY OF THE INVENTION

It is an aspect of the present disclosure to provide a system and method for managing a game of chance which presents betting odds for betting squares associated with a live sporting event and allows users to place wagers on the betting squares based on the presented betting odds in a simple and convenient manner.

It is another aspect of the present disclosure to provide a system and method for managing a game of chance which allows users to place wagers on betting squares associated with a live sporting event without an associated pool of other users.

It is another aspect of the present disclosure to provide a system and method for managing a game of chance that allows users to earn winnings in association with betting squares from a general game account rather than a pool associated with only the specific game at hand.

It is another aspect of the present disclosure to provide a system and method for managing a game of chance that provides a simple manner of transferring funds between a user account and a game account.

According to these and other aspects of the disclosure, a method for managing a game of chance is provided. The method includes generating a grid with a processing device, wherein the grid is comprised of a plurality of squares defined by a plurality of rows and a plurality of columns of the squares, The rows are each numbered with one of a plurality of row numbers, and the columns are each numbered with one of a plurality of column numbers. The method also includes establishing betting odds for each of the squares with the processing device, wherein the betting odds of each of the squares are associated with a likelihood of the square being established as a winning square. Each of the squares correlates with one of the row numbers associated with the row in which the square is located and one of the column numbers associated with the column in which the square is located. The squares are each designated as a winning square in response to the score of the live sporting event including a digit of a score of the rows team being the same as the row number of the square, and a digit of a score of the columns team being the same as the column number of the square at the end of the predetermined interval of the live sporting event. The method also includes presenting the plurality of squares and the betting odds associated with each of the squares on at least one graphical user interface. The method further includes receiving a selection of at least one of the squares and an associated wager from at least one user with at least one input device. The method also includes establishing a winning square after passage of the predetermined interval in the live sporting event. The method further includes determining if the winning square was selected by the at least one user. The method also includes transferring funds to the user upon a determination that the winning square was selected by the user, wherein the funds correlate with the placed wager and the betting odds associated with the square.

According to another aspect of the disclosure, a system for managing a game of chance is provided. The system includes at least one graphical user interface for displaying aspects of the game of chance to users. The system also includes at least one input device for receiving inputs from the users and at least one processing device electrically connected to the at least one graphical user interface and the at least one input device. The at least one processing device is configured to generate a grid, wherein the grid is comprised of a plurality of squares defined by a plurality of rows of the squares and a plurality of columns of the squares, wherein each of the rows are numbered with one of a plurality of row numbers, and wherein each of the columns are numbered with one of a plurality of column numbers. The at least one processing device is also configured to establish a first of two teams in a live sporting event as a rows team and establish a second of the two teams as a columns team. The at least one processing device is also configured to establish betting odds for each of the squares, wherein the betting odds of each of the squares are associated with a likelihood of the square being established as a winning square. Each of the squares correlates with one of the row numbers associated with the row in which the square is located and one of the column numbers associated with the column in which the square is located. The squares are each designated as a winning square in response to the score of the live sporting event including a digit of a score of the rows team being the same as the row number of the square, and a digit of a score of the columns team being the same as the column number of the square at the end of the predetermined interval of the live sporting event. The at least one processing device is also configured to present the plurality of squares and the betting odds associated with each of the squares on at least one graphical user interface. The at least one processing device is further configured to receive at least one wager and a selection of at least one of the squares from at least one user with at least one input device. The at least one processing device is also configured to establish a winning square after passage of the predetermined interval in the live sporting event. The at least one processing device is also configured to determine if the winning square was selected by the at least one user. The at least one processing device is also configured to transfer funds to the user upon a determination that the winning square was selected by the user, wherein the funds correlate with the wager and the betting odds associated with the square.

BRIEF DESCRIPTION OF THE DRAWINGS

Other aspects of the present disclosure will be readily appreciated, as the same becomes better understood by reference to the following detailed description when considered in connection with the accompanying drawings wherein:

FIG. 5 is a further example embodiment of a plurality of squares and associated betting odds presented on the graphical user interface, according to an aspect of the disclosure.

DESCRIPTION OF THE EXAMPLE EMBODIMENT

In the following description, details are set forth to provide an understanding of the present disclosure. In some instances, certain systems, structures and techniques have not been described or shown in detail in order not to obscure the disclosure. It should be appreciated that the features of the various embodiments discussed herein may be used in association with one another in various combinations.

Figure 1:
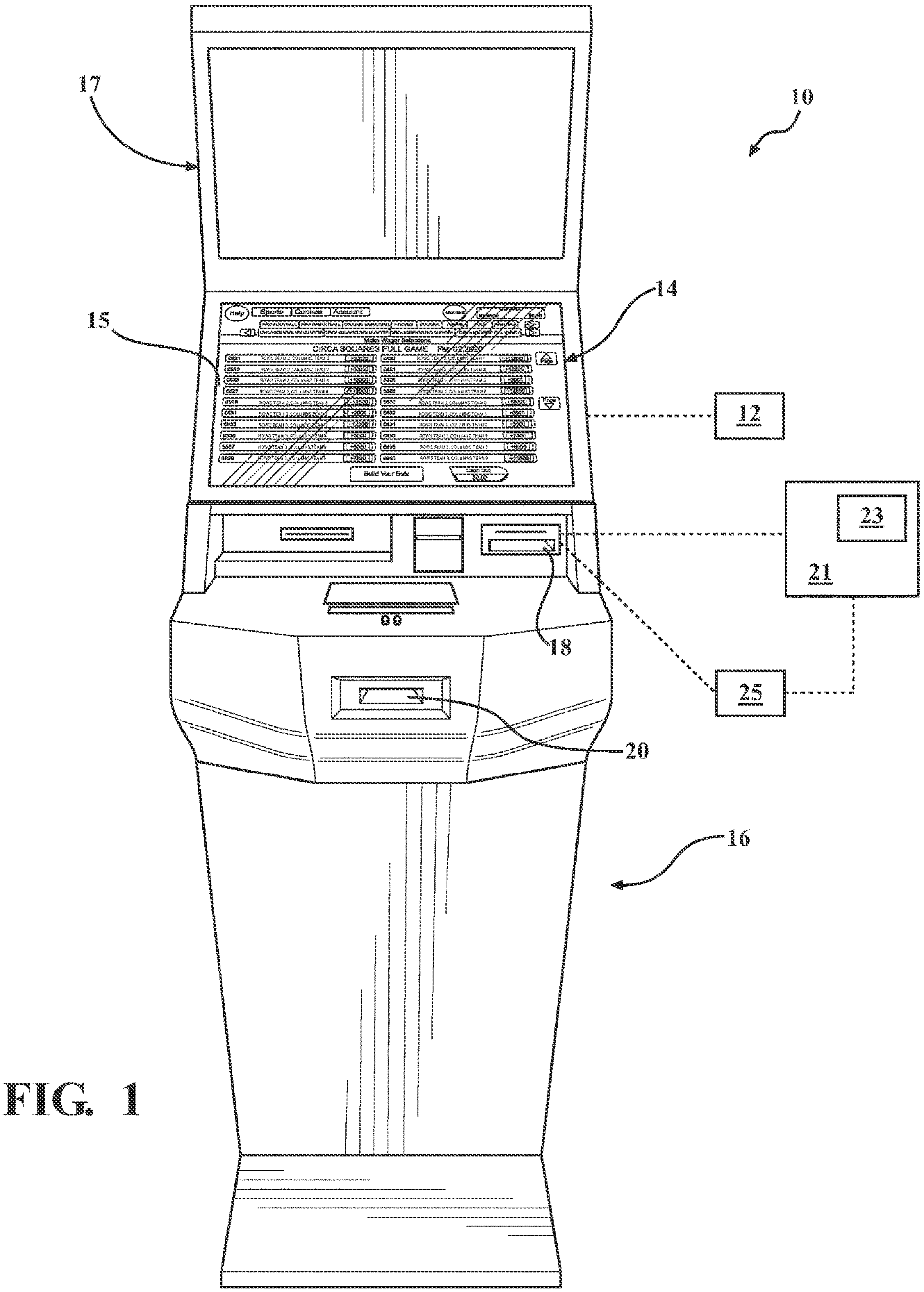
FIG. 1 is an example embodiment of a kiosk including a processing device, a graphical user interface, an input device and a currency transferring mechanism of the subject system and method, according to an aspect of the disclosure.

Referring to the figures, wherein like numerals indicate corresponding parts throughout the several views, a system 10 for managing a game of chance, particularly a betting squares game is shown. The squares game may be associated with various live sporting events between two teams including, but not limited to, American football, baseball, hockey and soccer. The system 10 includes at least one processing device 12 (schematically shown), at least one graphical user interface 14 and at least one input device 15. The graphical user interface 14 and input device 15 are electrically connected to the processing device 12 for receiving and transmitting information from the graphical user interface 14 and input device 15. The example embodiment includes a single processing device 12, a single graphical user interface 14 and a single input device 15, however, it should be appreciated that any number of these devices could be employed without departing from the scope of the subject disclosure. Furthermore, any number of the processing devices 12 may be electronically connected to one another to allow users at different locations to simultaneously play the squares game. As shown in FIG. 1, according to the example embodiment, the processing device 12, graphical user interface 14 and input device 15 are integrated into a kiosk 16 like those found on casino floors, however, they could alternatively be integrated into other devices such as personal computers, smartphones and tablets.

The term "processing device" as used herein encompasses various types of processors and associated components such as those found in personal computers, smart phones, tablets, etc. For example, the processing device 12 may include a processor and associated non-transitory computer-readable storage media storing computer-executable instructions that, when executed by the processor, instruct devices (such as the graphical user interface 14, input device 15 and currency transferring mechanism 18, 20, (discussed below)) to perform actions. The processing device 12 may be connected to the internet for pulling information from various sources, for electronically managing the system 10 and for linking multiple processing devices 12 to one another.

The input device 15 is configured to allow a user to provide inputs associated with the game. In the example embodiment, the input device 15 is a touch screen of the graphical user interface 14, however various other input devices could be employed including but not limited to, a series of buttons, a keyboard or a microphone for receiving voice commands, without departing from the scope of the subject disclosure. Beyond the touch screen shown in the example embodiment, the input device 15 could include touch screens of other devices such as smart phones, tablets or personal computers.

The graphical user interface 14 is configured to present information related to the game to users. According to the example embodiment, the graphical user interface 14 is a monitor on a kiosk 17, however other graphical user interfaces could be employed including, but not limited to, screens of smart phones, tablets or personal computers.

Figure 2:
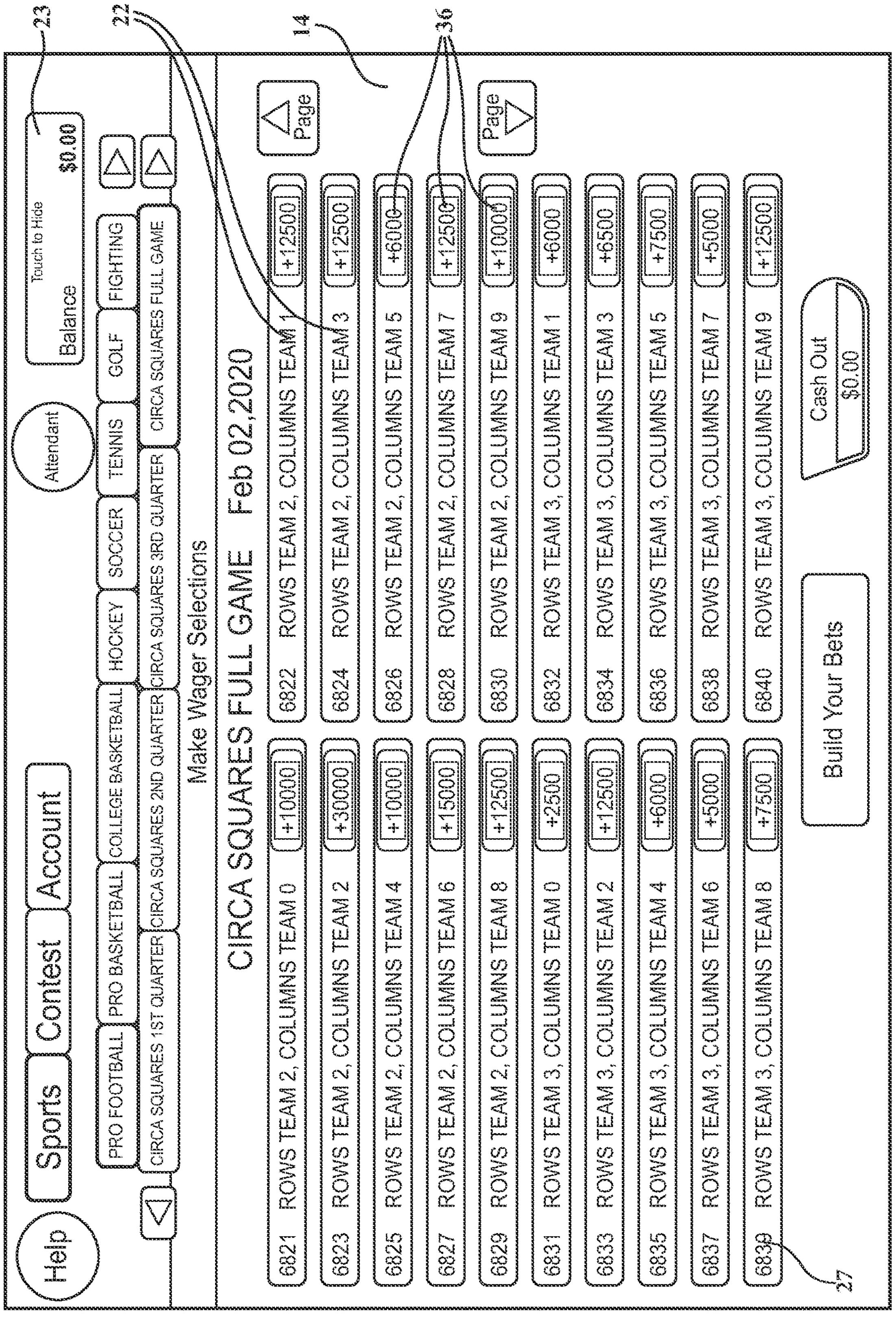
FIG. 2 is an example embodiment of a plurality of squares and associated betting odds presented on the graphical user interface, according to an aspect of the disclosure.
Figure 3:
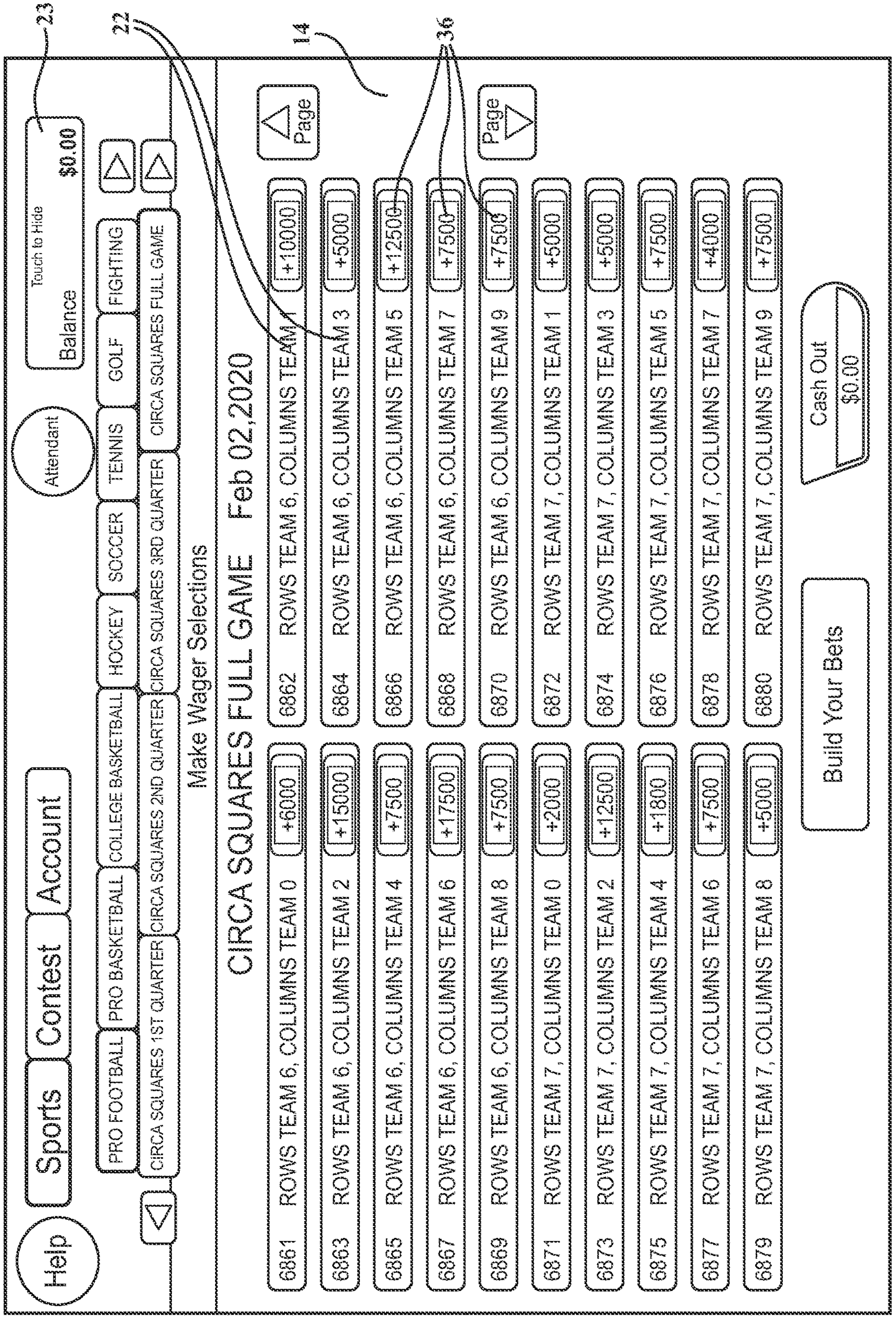
FIG. 3 is a further example embodiment of a plurality of squares and associated betting odds presented on the graphical user interface, according to an aspect of a disclosure.
Figure 4:
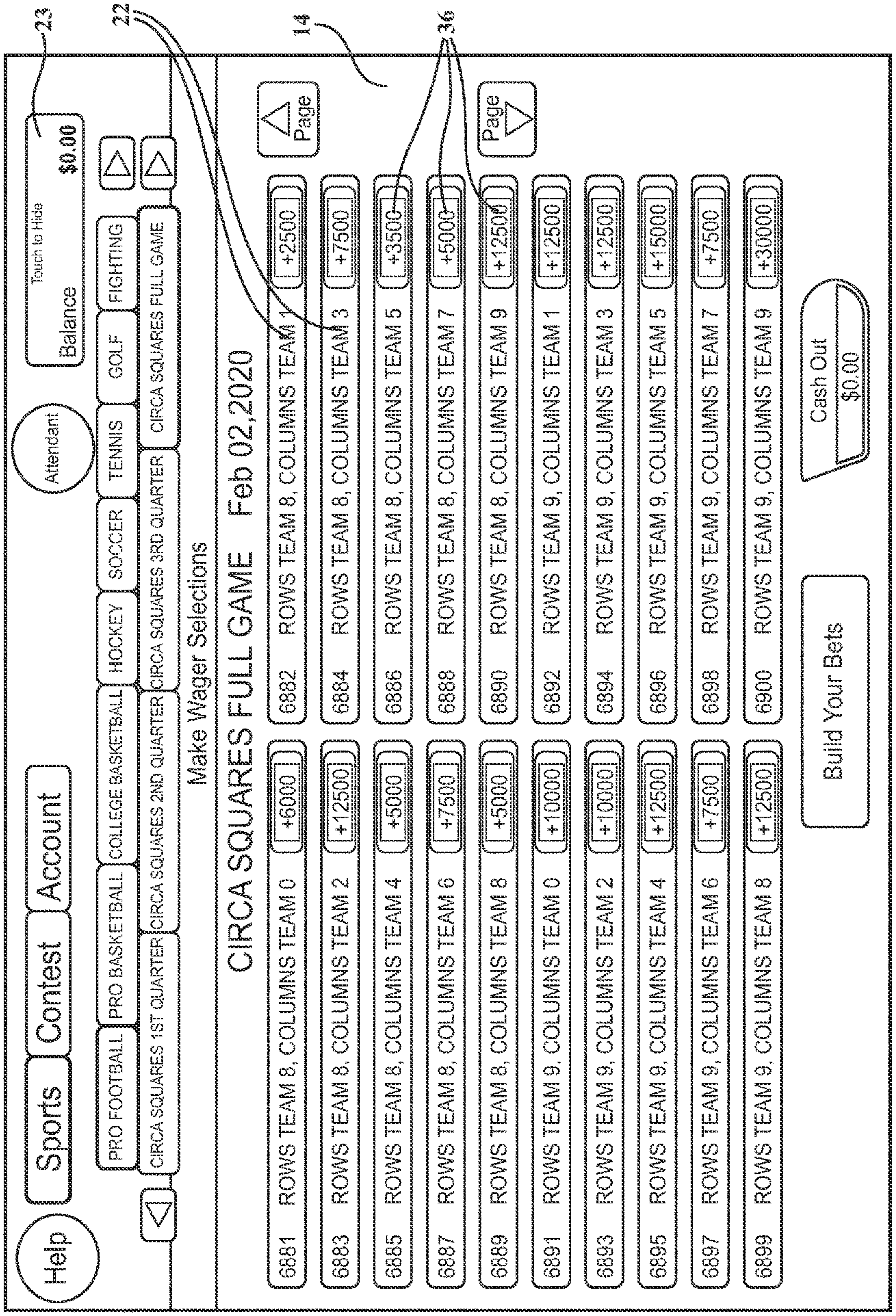
FIG. 4 is a further example embodiment of a plurality of squares and associated betting odds presented on the graphical user interface, according to an aspect of a disclosure.

The system 10 further includes a currency transferring mechanism 18, 20 that is electrically connected with the processing device 12 for transferring funds between a user account 25 and a game account 21 associated with the game. As shown in FIGS. 2-4, a balance of a user's sub-account 23 of the game account 21 may be shown on the graphical user interface 14. It should be appreciated that the game account 21 may be a general casino account, and thus not tied to a pool funded exclusively by participants in the squares game, as is common with traditional squares games. The currency transferring mechanism 18, 20 may include a currency receiving mechanism 18 for receiving funds from the user, and a currency emitting mechanism 20 for transferring funds from the game account 21 to the user. The currency transferring mechanism 18, 20 may be entirely electronic, thus allowing a user to electrically transfer funds from and to various user accounts 25 such as personal bank accounts or credit cards via an internet connection. Alternatively, the currency transferring mechanism 18, 20 may include cash receiving and distributing mechanisms. According to such an embodiment, the user's cash constitutes their user account 25.

Figure 6:
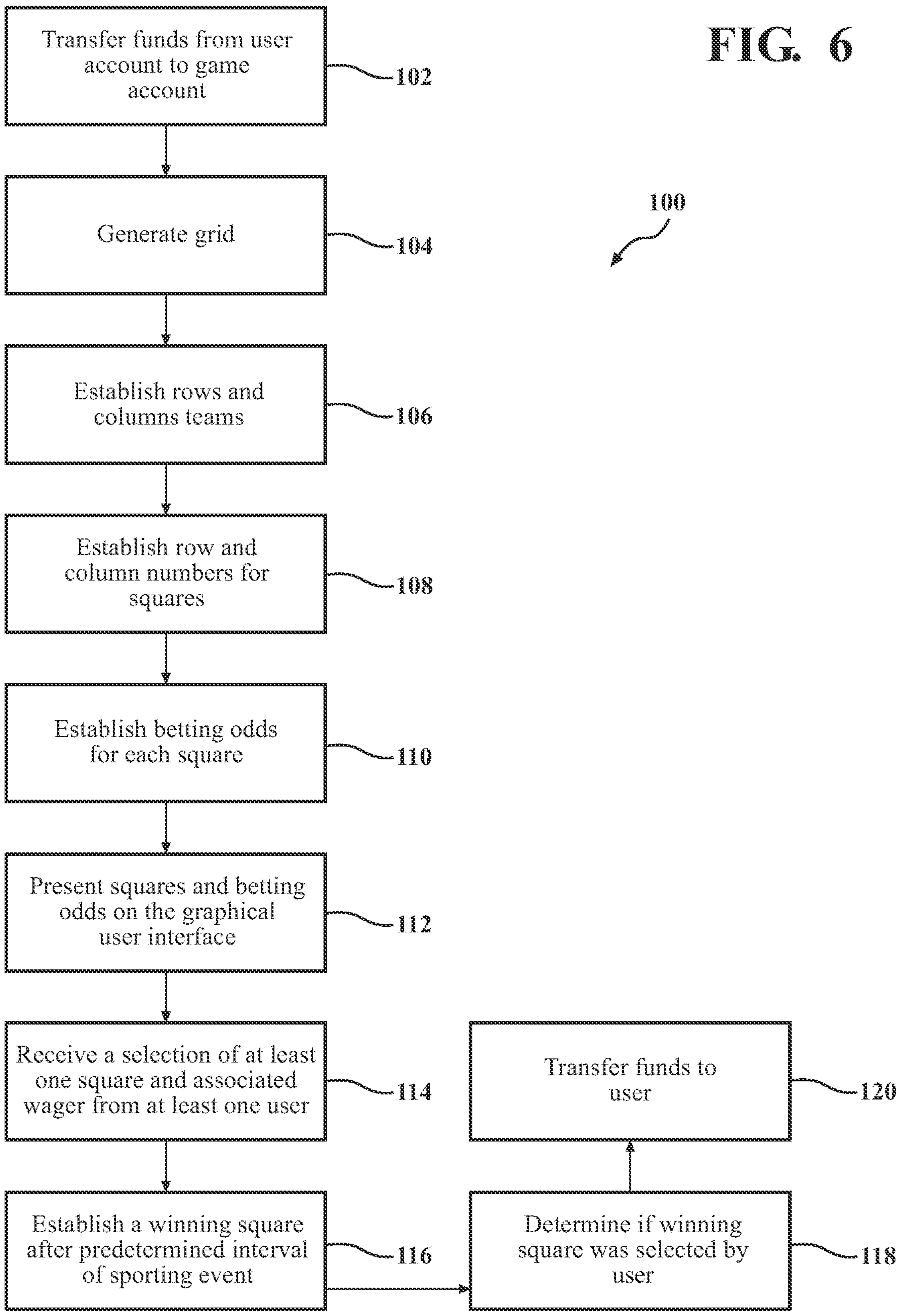
FIG. 6 is a flow diagram illustrating a method of managing a game of chance according to an aspect of the disclosure.

With reference to FIG. 6 the subject disclosure further includes a method 100 of using the subject system 10. The method 100 includes the following steps which may be executed in various orders. The method may include 102 transferring funds from the user account 25 to the game account 21 (e.g., in the user's sub-account 23) with the currency transferring mechanism 18, 20. As previously noted, user funds may be transferred from various user accounts 25 electronically or in the form of cash. As shown in FIGS. 2-6, a balance of a user's sub-account 23 of the game account 21 may be displayed on the graphical user interface 14. The method may include 104 generating a grid 13 (e.g., as shown in FIG. 5) comprised of a plurality of squares 22 and defined by a plurality of rows and columns. According to the example embodiment, the grid 13 is a 10×10 grid, but other sizes may be used. The grid 13 may be displayed on the graphical user interface 14 or may be exclusively stored internally by the processing device 12. Each of the rows of the grid 13 are numbered with one of a plurality of row numbers 28, and each of the columns of the grid 13 are numbered with one of a plurality of column numbers 30. The row and column numbers 28, 30 may be presented in any order and may be randomly selected. According to the example embodiment, the row numbers 28 are associated with how many rows are present on the grid 13. Likewise, the column numbers 30 are associated with how many columns are present on the grid 13, however, other arrangements may be employed. In the example embodiment, ten rows are provided, thus the cells in the leftmost column are numbered zero through nine, and ten columns are provided, thus the cells in the topmost row are numbered zero through nine.

The method may also include 106 establishing a first of two teams of the live sporting event as a "rows" team 32 and establishing a second of the two teams as a "columns" team 34 with the processing device 12. The system 10 may be configured to establish the rows and columns teams 32, 34 teams by pulling information from a sporting events database accessible by the processing device 12. The sporting events database may include a compilation of various upcoming sporting events from various sports. As illustrated in FIGS. 2-4, the processing device 12 may be configured to display the sporting events on the graphical user interface 14 to permit the user to select a sporting event from the compilation. Upon selecting one of the sporting events, the rows and columns teams 32, 34 are established by the processing device 12.

The method further includes 108 establishing a row number and column number for each of the squares 22. The row number of each of the squares 22 is the row number in which the square 22 is located, and the column number of each of the squares 22 is the column number in which the square 22 is located. For example, the square located in row 2, column 2 has a row number of 2 and a column number of 2.

The method also includes 110 establishing betting odds 36 for each of the squares 22 with the processing device 12. The betting odds 36 of each of the squares 22 are associated with a likelihood of the square 22 being established as a winning square. The squares 22 are established as winning squares in response to the score of the live sporting event including a digit of the rows team 32 being the same as the row number of the square 22, and a digit of a score of the columns team 34 being the same as the column number of the square 22 at the end of the predetermined interval of the sporting event. According to the example embodiment, the digit of the score of the rows team 32 is the final digit of the score of the rows team 32 and the digit of the score of the columns team 34 is the final digit of the score of the columns team 34. Other digits of the rows and columns teams' 32, 34 scores may be used without departing from the scope of the subject disclosure. Establishing betting odds 36 may further include evaluating prior performances of the determined rows and columns teams 32, 34 to determine a likelihood of each of the squares 22 being established as the winning square. More particularly, according to an aspect of the disclosure, the betting odds 36 may factor in how frequently the row and column numbers of the square 22 have appeared in the team's score at the ends of specific intervals and/or at the end of the game. According to another aspect of the disclosure, the betting odds 36 may factor in offensive and/or defensive strengths of each team. For example, a number of points a team historically scores and gives up may be factored in. The manner in which a team scores may also be factored in. For example, with American football teams, how frequently touchdowns are historically scored, how frequently two-point conversions are historically attempted and completed, and how frequently field goals are historically attempted and completed may be factored in. Various time frames may be evaluated in determining any of the aforementioned statistics, e.g., a previous three games or a previous season.

As best illustrated in FIGS. 2-4, the method also includes 112 presenting the plurality of squares 22 and associated betting odds 36 on the at least one graphical user interface 14. As shown, the presentation of each square 22 may include the names of the rows and columns teams 32, 34 along with their associated row and column numbers and betting odds 36 and a bet identifier number 27. As also illustrated, various menus may be presented on the graphical user interface 12 to allow users to browse various sporting events in different sports and at different times and their associated squares 22.

The method further includes 114 receiving a selection of at least one of the squares 22 and an associated wager from at least one user with the at least one input device 15. According to the example embodiment, the square 22 may be selected by the user touching the square 22 on the touch screen display of the graphical user interface 14. Each user may select any number of squares 22 from different sporting events. Additionally, multiple users may bet on the same squares 22 within the same sporting events.

The method also includes 116 establishing a winning square after passage of the predetermined interval in the live sporting event. The method continues with 118 determining if the winning square was selected by the at least one user. Finally, if the winning square was selected by a user, the method includes 120 transferring funds from the game account 21 to the user sub-account 23 of game account 21 or user account 25, with the funds correlating with the wager and betting odds associated with the winning square. The user sub-account 23 may be tied to a ticket provided to the user upon the selection of a square 22 such that a user may redeem their funds by presenting the ticket to an agent associated with the game account 21.

The method may further include notifying the user of their selected square 22 being designated as a winning square. The user may be notified in various ways, such as a notification on the graphical user interface 14 (e.g., in a phone/computer app or web browser) or via audible sounds. Moreover a user may provide contact information, e.g., an e-mail address or cell phone number, to a database of the processing device 12 at any point such that the user may be notified of their winning square in manners such as a phone call, text, message, e-mail or the like.

The betting odds 36 may be updated periodically throughout the live sporting events, e.g., after predetermined intervals, such that they reflect updated likelihoods of the squares 22 being established as winning squares based on score changes in the live sporting event. Additionally, the betting odds 36 may be adjusted based on how many bets are placed on individual squares 22 from any users at any location and based on sizes of the bets. The updated betting odds 36 may be dynamically presented on the graphical user interface 14 such that additional wagers may be actively placed by users under the new betting odds. In view of the foregoing, the subject system 10 advantageously presents betting odds for betting squares 22 associated with a live sporting event. This provides increased enjoyment for users as it provides additional strategy of picking squares based on odds, unlike conventional squares games where squares are randomly assigned to participants. The subject system 10 also advantageously allows users to place wagers on the betting squares in a simple and convenient manner via the graphical user interface 14 and input device 15. This is contrary to conventional squares games which are typically tracked via pen and paper or a user generated spreadsheet. The subject system 10 also advantageously allows any number of squares 22 to be simultaneously selected by any number of users, and from any number of locations. For example, selections may be made by multiple users from kiosks 17 located at respective casinos or from respective smart phones located remotely from one another. This is contrary to conventional squares games, which again, are typically managed manually and from a single location. The subject system 10 also advantageously allows more than one user to place a wager on a single square 22 during one game. This is contrary to conventional squares betting games where only a single bet is permitted per square 22 during one game. This advantage is partially provide because the game of the subject system 10 may be tied to a general game/casino account 21 that is not limited to funds associated with the specific squares game at hand as with conventional squares games. The subject system 10 also advantageously allows users to place wagers on betting squares 22 without participation by a full pool of other users, as with conventional squares games. In other words, because winnings may be funded by a general game account 21 instead of a fund that is specific to the squares game, it is not necessary for a predetermined number of squares 22 to be selected to fund the game account 21. The subject system 10 also advantageously provides a simple manner of transferring funds between the user account 21 and the game account 25, unlike conventional squares games in which a designated organizer gathers and distributes funds. The subject system 10 may also advantageously be played on one or more, kiosks, mobile devices and/or personal computers that may be interlinked with one another. This advantageously allows any number of people to play the game from any number of locations.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A method for managing a game of chance, comprising:

generating a grid with a processing device, wherein the grid is comprised of a plurality of squares defined by a plurality of rows of the squares and a plurality of columns of the squares, wherein the rows are each numbered with one of a plurality of row numbers, and wherein the columns are each numbered with one of a plurality of column numbers;

establishing a first of two teams in a live sporting event as a rows team and establishing a second of the two teams as a columns team with the processing device;

establishing betting odds for each of the squares with the processing device, wherein each of the squares correlates with the one of the row numbers associated with the row in which the square is located and the one of the column numbers associated with the column in which the square is located, and wherein the squares are each designated as a winning square in response to the score of the live sporting event including a digit of a score of the rows team being the same as the one of the row numbers associated with the square, and a digit of a score of the columns team being the same as the one of the column numbers associated with the square at the end of the predetermined interval of the live sporting event, wherein the betting odds of each of the squares are associated with a likelihood of the square being established as a winning square, and wherein the betting odds are based on prior performances of the rows and columns teams;

presenting the plurality of squares and the betting odds associated with each of the squares on at least one graphical user interface;

receiving a selection of at least one of the squares and an associated wager from at least one user with at least one input device;

establishing a winning square after passage of the predetermined interval in the live sporting event;

determining if the winning square was selected by the at least one user; and transferring funds to the user upon a determination that the winning square was selected by the user, wherein the funds correlate with the wager and the betting odds associated with the square.

2. The method as set forth in claim 1, wherein basing the betting odds on the prior performances of the rows and columns teams includes an evaluation of how frequently the row and column numbers of each of the squares appears at the rows team and columns team scores at predetermined intervals of, or at the end of the live sporting event.

3. The method as set forth in claim 1, further including receiving a selection of one of the squares by a plurality of users.

4. The method as set forth in claim 3, wherein the at least one input device includes a plurality of input devices located remote from one another such that a plurality of users may simultaneously place wagers and select squares from locations remote from one another.

5. The method as set forth in claim 1, wherein the at least one graphical user interface includes a plurality of graphical user interfaces, and wherein the at least one input device includes a plurality of input devices such that a plurality of users may simultaneously place wagers and select squares from locations remote from one another.

6. The method as set forth in claim 5, wherein the plurality of graphical user interfaces are located remotely from one another.

7. The method as set forth in claim 1, wherein the at least one graphical user interface and the at least one input device are each located on a kiosk.

8. The method as set forth in claim 1, wherein the at least one graphical user interface and the at least one input device are each located on one of a smart phone and a tablet.

9. The method as set forth in claim 1, wherein the at least one input device is a touch-screen of the graphical user interface.

10. The method as set forth in claim 1, further including receiving funds into a game account from a user account via a currency transferring mechanism.

11. The method as set forth in claim 10, further including transferring funds to a user account from a game account via the currency transferring mechanism.

12. A system for managing a game of chance, comprising:

at least one graphical user interface for displaying aspects of the game of chance to users;

at least one input device for receiving inputs from the users;

at least one processing device electrically connected to the at least one graphical user interface and the at least one input device;

wherein the at least one processing device is configured to:

generate a grid comprised of a plurality of squares defined by a plurality of rows of the squares and a plurality of columns of the squares, wherein the rows are each numbered with one of a plurality of row numbers, and wherein the columns are each numbered with one of a plurality of column numbers;

establish a first of two teams in a live sporting event as a rows team and establish a second of the two teams as a columns team with the processing device;

establish betting odds for each of the squares with the processing device, wherein each of the squares correlates with the one of the row numbers associated with the row in which the square is located and the one of the column numbers associated with the column in which the square is located, and wherein the squares are each designated as a winning square in response to the score of the live sporting event including a digit of a score of the rows team being the same as the one of the row numbers associated the square, and a digit of a score of the columns team being the same as the one of the column numbers associated with the square at the end of the predetermined interval of the live sporting event, wherein the betting odds of each of the squares are associated with a likelihood of the square being established as a winning square, and wherein the betting odds are based on prior performances of the rows and columns teams;

present the plurality of squares and the betting odds associated with each of the squares on at least one graphical user interface;

receive at least one wager and a selection of at least one of the squares from at least one user with at least one input device;

changing the betting odds for the plurality of the squares based on how many bets have been placed on the at least one of the squares, and dynamically updating the at least one graphical user interface to reflect the changed betting odds with the processing device;

establish a winning square after passage of the predetermined interval in the live sporting event;

determine if the winning square was selected by the at least one user; and transfer funds to a user account upon a determination that the winning square was selected by the user, wherein the funds correlate with the wager and the betting odds associated with the square.

13. The method as set forth in claim 12, wherein basing the betting odds on the prior performances of the rows and columns teams includes an evaluation of how frequently the row and column numbers of each of the squares appears at the rows team and columns team scores at predetermined intervals of, or the end of the live sporting event.

14. The system as set forth in claim 13, wherein the processing device is further configured to receive a selection of one of the at least one squares by a plurality of the users.

15. The system as set forth in claim 14, wherein the at least one input device includes a plurality of input devices located remote from one another such that a plurality of users may simultaneously place wagers and select squares from locations remote from one another.

16. The system as set forth in claim 13, wherein the at least one graphical user interface includes a plurality of graphical user interfaces, and wherein the at least one input device includes a plurality of input devices such that a plurality of users may simultaneously place wagers and select squares from locations remote from one another.

17. The system as set forth in claim 16, wherein the plurality of graphical user interfaces are located remotely from one another.

18. The system as set forth in claim 13, wherein the at least one graphical user interface and the at least one input device are each located on a kiosk.

19. The system as set forth in claim 13, wherein the at least one graphical user interface and the at least one input device are each located on one of a smart phone and a tablet.

20. A system for managing a game of chance, comprising:

at least one graphical user interface for displaying aspects of the game of chance to users;

at least one input device for receiving inputs from the users;

at least one processing device electrically connected to the at least one graphical user interface and the at least one input device;

wherein the at least one processing device is configured to:

generate a grid comprised of a plurality of squares defined by a plurality of rows of the squares and a plurality of columns of the squares, wherein the rows are each numbered with one of a plurality of row numbers, and wherein the columns are each numbered with one of a plurality of column numbers;

establish a first of two teams in a live sporting event as a rows team and establish a second of the two teams as a columns team with the processing device;

establish betting odds for each of the squares with the processing device, wherein the betting odds of each of the squares are associated with a likelihood of the square being established as a winning square, wherein each of the squares correlates with the one of the row numbers associated with the row in which the square is located and the one of the column numbers associated with the column in which the square is located, and wherein the squares are each designated as a winning square in response to the score of the live sporting event including a digit of a score of the rows team being the same as the one of the row numbers associated the square, and a digit of a score of the columns team being the same as the one of the column numbers associated with the square at the end of the predetermined interval of the live sporting event;

present the plurality of squares and the betting odds associated with each of the squares on at least one graphical user interface;

receive at least one wager and a selection of at least one of the squares from at least one user with at least one input device;

dynamically changing the betting odds for at least one of the squares with the processing device based on a size of the bets placed on the at least one of the squares or a number of bets placed on the at least one of the squares, and dynamically updating the plurality of user interfaces to reflect the changed betting odds with the processing device;

establish a winning square after passage of the predetermined interval in the live sporting event;

determine if the winning square was selected by the at least one user; and transfer funds to a user account upon a determination that the winning square was selected by the user, wherein the funds correlate with the wager and the betting odds associated with the square.

* * * * *